United States Patent
Mortimer et al.

(10) Patent No.: US 10,699,469 B2
(45) Date of Patent: Jun. 30, 2020

(54) CONFIGURABLE DEPTH-OF-FIELD RAYCASTER FOR MEDICAL IMAGING

(75) Inventors: John Mortimer, Calgary (CA); Tony Schellenberg, Calgary (CA); Pierre Lemire, Calgary (CA)

(73) Assignee: Calgary Scientific Inc., Calgary (CA)

( * ) Notice: Subject to any disclaimer, the term of this patent is extended or adjusted under 35 U.S.C. 154(b) by 2192 days.

(21) Appl. No.: 12/658,085

(22) Filed: Feb. 2, 2010

(65) Prior Publication Data

US 2010/0201685 A1    Aug. 12, 2010

Related U.S. Application Data

(60) Provisional application No. 61/202,167, filed on Feb. 3, 2009.

(51) Int. Cl.
*G06T 15/08* (2011.01)
*G06T 15/00* (2011.01)
(Continued)

(52) U.S. Cl.
CPC .............. *G06T 15/08* (2013.01); *G06T 15/00* (2013.01); *G06T 15/06* (2013.01)

(58) Field of Classification Search
USPC .................................. 345/426, 428; 382/131
See application file for complete search history.

(56) References Cited

U.S. PATENT DOCUMENTS 5,025,400 A * 6/1991 Cook et al. ................... 345/611
5,187,574 A   2/1993 Kosemura et al.
(Continued)

FOREIGN PATENT DOCUMENTS

| CA | 2261069 | 11/1998 |
|---|---|---|
| CA | 2239994 | 12/1998 |

(Continued)

OTHER PUBLICATIONS

Boulos, S., Edwards, D., Lacewell, J. D., Kniss, J., Kautz, J., Shirley, P., and Wald, I., Jun. 1, 2006, "Interactive Distribution Ray Tracing", Technical report UUSCI-2006-022, SCI Institute, University of Utah, 13 pages.*

(Continued)

*Primary Examiner* — Tize Ma
(74) *Attorney, Agent, or Firm* — Meunier Carlin & Curfman LLC (57) ABSTRACT

A method for volume ray casting is provided. For each pixel of a 2D image placed in a view plane a ray of sight is projected through a volume determined by a plurality of voxels of a volumetric dataset indicative of an object. A plurality of sampling points is determined along each ray of sight such that a distance between two consecutive sampling points is larger at a larger distance to the view plane. At each sampling point a color value and a transparency value is determined in dependence upon voxels in proximity of the sampling point and a lighting calculation, wherein for the lighting calculation a first lighting model and a second lighting model are used in dependence upon a distance of the sampling point to the view plane. For each ray of sight a final color value is determined by compositing along the ray the color values and the transparency values. The final color value of each ray corresponds to a pixel value of the 2D image. The color and the transparency value of a sampling point are composited with the color and transparency value of a previous sampling point before determining the color and transparency value of a following sampling point. The compositing is stopped when the composited transparency value is within a predetermined range less than a value indicative of opacity.

7 Claims, 4 Drawing Sheets

(51) Int. Cl.
*G06T 17/00* (2006.01)
*G06T 15/06* (2011.01)

(56) References Cited

U.S. PATENT DOCUMENTS

| | | | |
|---|---|---|---|
| 5,886,733 | A | 3/1999 | Zdepski |
| 6,028,608 | A * | 2/2000 | Jenkins .................. 345/619 |
| 6,119,154 | A | 9/2000 | Weaver et al. |
| 6,271,847 | B1 | 8/2001 | Shum et al. |
| 6,674,430 | B1 * | 1/2004 | Kaufman et al. .......... 345/419 |
| 6,888,551 | B2 | 5/2005 | Willis et al. |
| 7,333,236 | B2 | 2/2008 | Herrmann |
| 7,370,120 | B2 | 5/2008 | Kirsch et al. |
| 7,379,605 | B1 | 5/2008 | Ticsa |
| 7,430,261 | B2 | 9/2008 | Forest et al. |
| 7,432,935 | B2 * | 10/2008 | Keller .................. 345/581 |
| 7,519,209 | B2 | 4/2009 | Dawant et al. |
| 7,526,131 | B2 | 4/2009 | Weber |
| 7,574,247 | B2 | 8/2009 | Moreau-Gobard et al. |
| 7,586,953 | B2 | 9/2009 | Forest et al. |
| 7,606,314 | B2 | 10/2009 | Coleman et al. |
| 7,647,331 | B2 | 1/2010 | Li et al. |
| 7,912,259 | B2 | 3/2011 | Arditi et al. |
| 8,005,369 | B2 | 8/2011 | Ko et al. |
| 8,265,449 | B2 | 9/2012 | Nagahara et al. |
| 8,503,754 | B2 | 8/2013 | Roberts et al. |
| 8,589,995 | B2 | 11/2013 | Choi et al. |
| 2002/0101429 | A1 * | 8/2002 | Abdo .................. 345/581 |
| 2003/0025599 | A1 | 2/2003 | Monroe |
| 2003/0081840 | A1 | 5/2003 | Palmer et al. |
| 2004/0005005 | A1 | 1/2004 | McIntyre et al. |
| 2005/0033758 | A1 | 2/2005 | Baxter |
| 2005/0100220 | A1 | 5/2005 | Keaton et al. |
| 2005/0105786 | A1 | 5/2005 | Moreau-Gobard et al. |
| 2005/0110791 | A1 | 5/2005 | Krishnamoorthy et al. |
| 2005/0111718 | A1 | 5/2005 | MacMahon et al. |
| 2006/0008254 | A1 | 1/2006 | Seo |
| 2006/0013482 | A1 | 1/2006 | Dawant et al. |
| 2006/0173272 | A1 | 8/2006 | Qing et al. |
| 2006/0222081 | A1 | 10/2006 | Carrigan |
| 2007/0031019 | A1 | 2/2007 | Lesage et al. |
| 2007/0036402 | A1 | 2/2007 | Cahill et al. |
| 2007/0103567 | A1 | 5/2007 | Wloka |
| 2007/0162568 | A1 | 7/2007 | Gupta et al. |
| 2008/0008401 | A1 | 1/2008 | Zhu |
| 2008/0126487 | A1 | 5/2008 | Wegenkittl et al. |
| 2008/0137921 | A1 | 6/2008 | Simon et al. |
| 2008/0143718 | A1 | 6/2008 | Ray et al. |
| 2008/0175377 | A1 | 7/2008 | Merrill |
| 2008/0246770 | A1 * | 10/2008 | Kiefer et al. ............. 345/441 |
| 2009/0083809 | A1 | 3/2009 | Hayashi et al. |
| 2009/0087161 | A1 | 4/2009 | Roberts et al. |
| 2009/0125570 | A1 | 5/2009 | Bailey et al. |
| 2009/0150557 | A1 | 6/2009 | Wormley et al. |
| 2010/0229201 | A1 | 9/2010 | Choi et al. |
| 2011/0085025 | A1 | 4/2011 | Pace et al. |
| 2011/0126127 | A1 | 5/2011 | Mariotti et al. |
| 2011/0202947 | A1 | 8/2011 | Gupta et al. |
| 2011/0202966 | A1 | 8/2011 | Gupta et al. |
| 2011/0310446 | A1 | 12/2011 | Komatsu |
| 2012/0011568 | A1 | 1/2012 | Tahan |
| 2012/0084350 | A1 | 4/2012 | Xie |
| 2012/0200774 | A1 | 8/2012 | Ehlers |
| 2012/0310660 | A1 | 12/2012 | Liu et al. |
| 2013/0019257 | A1 | 1/2013 | Tschernutter et al. |
| 2013/0163835 | A1 | 6/2013 | Park |
| 2013/0179186 | A1 | 7/2013 | Birtwhistle et al. |
| 2013/0215246 | A1 | 8/2013 | Ozaki |
| 2013/0227013 | A1 | 8/2013 | Maskatia et al. |
| 2015/0046953 | A1 | 2/2015 | Davidson et al. |
| 2015/0163379 | A1 | 6/2015 | Herzog |

FOREIGN PATENT DOCUMENTS

| | | |
|---|---|---|
| CA | 2427590 | 5/2001 |
| EP | 1744287 | 4/2008 |
| WO | 2010/085898 | 8/2010 |
| WO | 2010/085899 | 8/2010 |
| WO | 2013/001344 | 1/2013 |

OTHER PUBLICATIONS

Christensen, P. H., Laur, D. M., Fong, J., Wooten, W. L., and Batali, D., 2003., "Ray Differentials and Multiresolution Geometry Caching for Distribution Ray Tracing in Complex Scenes." Computer Graphics Forum (Eurographics 2003 Conference Proceedings), pp. 543-552 . . . , Blackwell Publishers.*

Erik Mansson, Jacob Munkberg, and Tomas Akenine-Moller, Sep. 10-Sep. 12, 2007, "Deep Coherent Ray Tracing", Proceedings of the 2007 IEEE Symposium on Interactive Ray Tracing (RT '07), IEEE Computer Society, Washington, DC, USA, pp. 79-85.*

Zhou, T., Chen, J., and Pullen, M.; 2007, "Accurate depth of field simulation in real time", Computer Graphics Forum, vol. 26, 1, pp. 15-23.*

Christian Ledergerber et al, "Volume MLS Ray Casting", IEEE Transactions on Visualization and Computer Graphics, Vol. 14, No. 6, Nov./Dec. 2008, pp. 1372-1379.*

Adalsteinsson, D., et al., "A Fast Level Set Method for Propagating Interfaces," Journal of Computational Physics, vol. 8, No. 2, Sep. 1994, pp. 269-277.

Baillard, C., et al., "Robust Adaptive Segmentation of 3D Medical Images with Level Sets," INRIA, Rennes, France, Research Report No. 1369, Nov. 2000, 28 pages.

Billeter, M., et al., "Efficient Stream Compaction on Wide SIMD Many-Core Architectures," Proceedings of the ACM SIGGRAPH/Eurographics Conference on High Performance Graphics, HPG, 2009, pp. 159-166.

Billow, T., "A General Framework for Tree Segmentation and Reconstruction from Medical vol. Data," Proceedings of the 7th International Conference on Medical Image Computing and Computer-Assisted Intervention, Saint-Malo, France, MICCAI, vol. 3216, 2004, pp. 533-540.

Carrillo, J., et al., "Recursive tracking of vascular tree axes in 3D medical images," International Journal of Computer Assisted Radiology and Surgery, vol. 1, Issue 6, Apr. 2007, pp. 331-339.

Cates, J.E., et al., "GIST: an interactive, GPU-based level set segmentation tool for 3D medical images," Medical Image Analysis, vol. 8, Issue 3, 2004, pp. 217-231.

Cocosco, C.A., et al., "BrainWeb: Online Interface to a 3D MRI Simulated Brain Database," NeuroImage, vol. 5, No. 4, 1997, p. 425.

Deschamps, T., "Curve and Shape Extraction with Minimal Paths and Level-Sets Techniques. Applications to 3D Medical Imaging," Ph.D. thesis, Universite Paris-IX, Dauphine, 2001, 233 pages.

Kindlmann, G., et al., "Curvature-based transfer functions for direct vol. rendering: methods and applications," Proceedings of the 14th IEEE Visualization, 2003, pp. 513-520.

Lefohn, A.E., et al., "A Streaming Narrow-Band Algorithm: Interactive Computation and Visualization of Level Sets," IEEE Transactions on Visualization an dComputer Graphics, vol. 10, No. 4, 2004, pp. 422-433.

Lefohn, A.E., et al., "Interactive Deformation and Visualization of Level Set Surfaces Using Graphics Hardware," IEEE Visualization, 2003, pp. 75-82.

Lefohn, A.E., et al., "Interactive, GPU-Based Level Sets for 3D Brain Tumor Segmentation," Apr. 16, 2003, 15 pages.

Lefohn, A.E., et al., Interactive, GPU-Based Level Sets for 3D Segmentation, MICCAI, 2003, pp. 564-572.

Peng, D., et al., "A PDE-Based Fast Local Level Set Method," Journal of Computational Physics, vol. 155, No. 2, 1999, pp. 410-438.

Roberts, Mike, et al., "A work-efficient GPU algorithm for level set segmentation," In Proceedings of the Conference on High Performance Graphics (HPG '10, Eurographics Association, Aire-la-Ville, Switzerland, 2010, pp. 123-132.

Rumpf, M., et al., "Level set segmentation in graphics hardware," Proceedings of IEEE International Conference on Image Processing, ICIP, vol. 3, 2001, pp. 1103-1106.

(56) References Cited

OTHER PUBLICATIONS

Schmittler, J., et al., "SaarCOR—A Hardware Architecture for Ray Tracing," Graphics Hardware, 2002, 11 pages.

Sengupta, S., et al., "Scan Primitives for GPU Computing," Graphics Hardware, 2007, 11 pages.

Sherbondy, A., et al., "Fast Volume Segmentation With Simultaneously Visualization Using Programmable Graphics Hardware," Proceedings of the 14th IEEE Visualization 2003, VIS, 2003, pp. 171-176.

Taheri, S., "3D Tumor Segmentation using Level Set," Course Notes, National University of Singapore, Apr. 2006, 40 pages.

Taheri, S., "Level-set segmentation of brain tumors in magnetic resonance images," Ph.D. thesis, National University of Singapore, Jul. 2007, 155 pages.

Whitaker, R.T., "A Level-Set Approach to 3D Reconstruction from Range Data," International Journal of Computer Vision, vol. 29, No. 3, 1998, pp. 203-231.

Extended European Search Report, dated Mar. 4, 2013, received in connection with European Application No. 10735473.0.

International Search Report and Written Opinion, dated Nov. 9, 2012, received in connection with International Application No. PCT/IB2012/001273.

International Search Report, dated Apr. 26, 2010, received in connection with International Application No. PCT/CA2010/000152.

International Preliminary Report on Patentability and Written Opinion, dated Aug. 2, 2011, received in connection with International Application No. PCT/CA2010/000152.

International Search Report, dated May 19, 2010, received in connection with International Application No. PCT/CA2010/000153.

International Preliminary Report on Patentability and Written Opinion, dated Aug. 2, 2011, received in connection with International Application No. PCT/CA2010/000153.

* cited by examiner

CONFIGURABLE DEPTH-OF-FIELD RAYCASTER FOR MEDICAL IMAGING

This application claims the benefit of U.S. Provisional Patent Application No. 61/202,167 filed Feb. 3, 2009, the entire contents of which are incorporated herein by reference.

FIELD OF THE INVENTION

The instant invention relates to computer graphics and in particular to a method for rendering a volume dataset using volume ray casting.

BACKGROUND

Modern hospitals utilize medical images from a variety of imaging devices such as, for example, a Computer Tomography (CT) scanner or a Magnetic Resonance Imaging (MRI) scanner producing volume datasets. The image data are then rendered for producing 2D images using a computer to enable medical professionals to view and diagnose the captured medical images.

Volume rendering is an important field of computer graphics and is of particular importance for medical applications for the rendering of volume image data sets generated by, for example, a CT or MRI scanner.

For rendering a volume dataset on a two dimensional display a view plane is defined, which depends on viewing parameters such as eye position, view direction, etc. For each point on the view plane a ray of sight is cast into the volume. Then the volume data are sampled at discrete sample points along each individual ray of sight. Each ray of sight accumulates color and transparency values along the ray of sight direction for each increment. The ray of sight is incremented until a maximum number of iterations has been reached, for example, the ray of sight travels until the back edge of the volume. Each increment of the ray includes a lighting calculation, typically using Phong shading comprising ambient, diffuse, and specular lighting calculations.

A major limitation of the employment of volume ray casting is its use of significant computational processing resources in particular when applied to large volume datasets of diagnostic quality medical images.

It would be desirable to provide a method for rendering a volume dataset using volume ray casting that substantially reduces the use of computational processing resources.

SUMMARY OF EMBODIMENTS OF THE INVENTION

In accordance with embodiments of the present invention there is provided a method for volume ray casting. For a pixel of a 2D image placed in a view plane a ray of sight is projected from the view plane through a volume determined by a plurality of voxels of a volumetric dataset indicative of an object. The view plane has a predetermined distance and orientation to the volume. A plurality of sampling points is determined along the ray of sight such that a distance between consecutive sampling points is larger at a larger distance to the view plane. For at least a portion of the plurality of sampling points a color value and a transparency value is determined in dependence upon voxels in proximity of the respective sampling point and in dependence upon a lighting calculation. For the ray of sight a final color value is determined by compositing along the ray the color values and the transparency values. The final color value of the ray contributes to a pixel value of the 2D image which is indicative of the object.

In accordance with embodiments of the present invention there is provided a further method for volume ray casting. For a pixel of a 2D image placed in a view plane a ray of sight is projected from the view plane through a volume determined by a plurality of voxels of a volumetric dataset indicative of an object. The view plane has a predetermined distance and orientation to the volume. A plurality of sampling points is determined along the ray of sight. For at least a portion of the plurality of sampling points a color value and a transparency value is determined in dependence upon voxels in proximity of the respective sampling point and in dependence upon a lighting calculation. For the lighting calculation a first lighting model and a second lighting model are used in dependence upon a distance of the sampling point to the view plane. For the ray of sight a final color value is determined by compositing along the ray the color values and the transparency values. The final color value of the ray contributes to a pixel value of the 2D image which is indicative of the object.

In accordance with embodiments of the present invention there is provided a further method for volume ray casting. For a pixel of a 2D image placed in a view plane a ray of sight is projected from the view plane through a volume determined by a plurality of voxels of a volumetric dataset indicative of an object. The view plane has a predetermined distance and orientation to the volume. A plurality of sampling points is determined along the ray of sight such that a distance between consecutive sampling points is larger at a larger distance to the view plane. For at least a portion of the plurality of sampling points a color value and a transparency value is determined in dependence upon voxels in proximity of the respective sampling point and in dependence upon a lighting calculation. For the ray of sight a final color value is determined by compositing along the ray the color values and the transparency values. The final color value of the ray contributes to a pixel value of the 2D image which is indicative of the object. The compositing is stopped when the composited transparency value is within a predetermined range less than a value indicative of opacity.

In accordance with embodiments of the present invention there is provided a storage medium having stored therein executable commands for execution on a processor of a computer system, the processor when executing the commands performing volume ray casting. For a pixel of a 2D image placed in a view plane a ray of sight is projected from the view plane through a volume determined by a plurality of voxels of a volumetric dataset indicative of an object. The view plane has a predetermined distance and orientation to the volume. A plurality of sampling points is determined along the ray of sight such that a distance between consecutive sampling points is larger at a larger distance to the view plane. For at least a portion of the plurality of sampling points a color value and a transparency value is determined in dependence upon voxels in proximity of the respective sampling point and in dependence upon a lighting calculation. For the ray of sight a final color value is determined by compositing along the ray the color values and the transparency values. The final color value of the ray contributes to a pixel value of the 2D image which is indicative of the object.

In accordance with embodiments of the present invention there is further provided a storage medium having stored therein executable commands for execution on a processor of a computer system, the processor when executing the commands performing volume ray casting. For a pixel of a 2D image placed in a view plane a ray of sight is projected from the view plane through a volume determined by a plurality of voxels of a volumetric dataset indicative of an object. The view plane has a predetermined distance and orientation to the volume. A plurality of sampling points is determined along the ray of sight. For at least a portion of the plurality of sampling points a color value and a transparency value is determined in dependence upon voxels in proximity of the respective sampling point and in dependence upon a lighting calculation. For the lighting calculation a first lighting model and a second lighting model are used in dependence upon a distance of the sampling point to the view plane. For the ray of sight a final color value is determined by compositing along the ray the color values and the transparency values. The final color value of the ray contributes to a pixel value of the 2D image which is indicative of the object.

In accordance with embodiments of the present invention there is yet further provided a storage medium having stored therein executable commands for execution on a processor of a computer system, the processor when executing the commands performing volume ray casting. For a pixel of a 2D image placed in a view plane a ray of sight is projected from the view plane through a volume determined by a plurality of voxels of a volumetric dataset indicative of an object. The view plane has a predetermined distance and orientation to the volume. A plurality of sampling points is determined along the ray of sight such that a distance between consecutive sampling points is larger at a larger distance to the view plane. For at least a portion of the plurality of sampling points a color value and a transparency value is determined in dependence upon voxels in proximity of the respective sampling point and in dependence upon a lighting calculation. For the ray of sight a final color value is determined by compositing along the ray the color values and the transparency values. The final color value of the ray contributes to a pixel value of the 2D image which is indicative of the object. The compositing is stopped when the composited transparency value is within a predetermined range less than a value indicative of opacity.

BRIEF DESCRIPTION OF THE FIGURES

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Unless defined otherwise, all technical and scientific terms used herein have the same meaning as commonly understood by one of ordinary skill in the art to which the invention belongs.

While embodiments of the invention will be described for rendering volume medical image data for the sake of simplicity, it will become evident to those skilled in the art that the embodiments of the invention are not limited thereto, but are applicable in numerous other fields where volume ray casting is employed for rendering volume data sets such as, for example, geophysical applications, scientific simulations, 3D design, gaming and entertainment.

Figure 1:
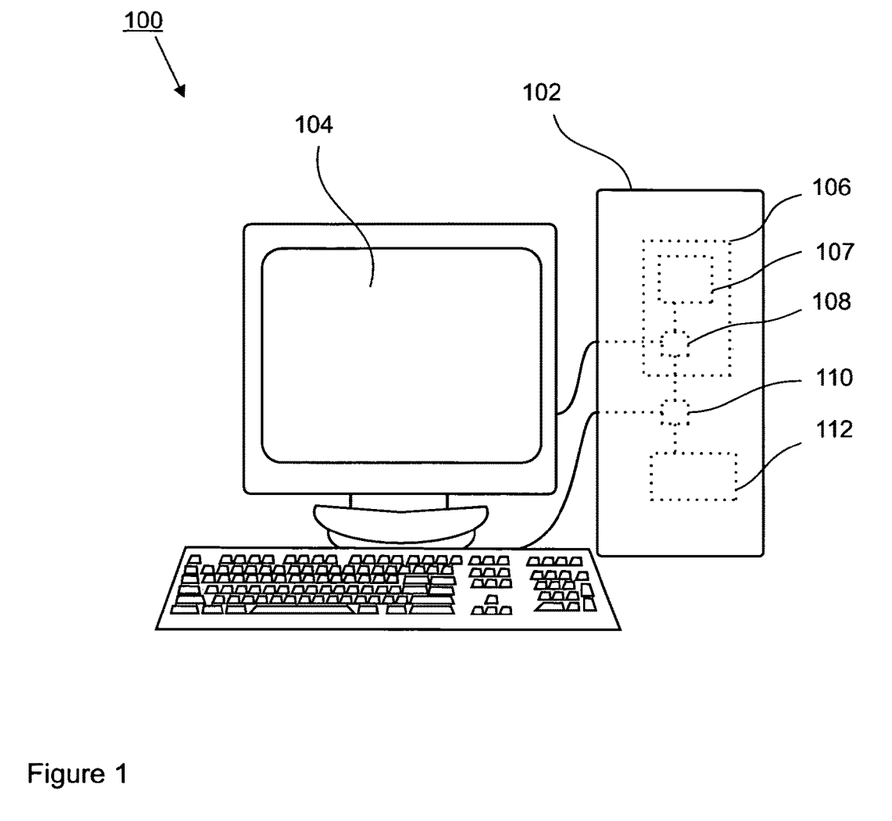
FIG. 1 is a simplified block diagram of a system for implementing the method for volume ray casting according to embodiments of the invention.

Referring to FIG. 1, an example 100 of a system for implementing a method for volume ray casting according to embodiments of the invention described herein below is shown. The system comprises, for example, a workstation 102 for rendering images using a Graphics Processing Unit (GPU) 106. For example, a medical practitioner is rendering images from a volume dataset for performing a diagnosis. During the rendering process the medical practitioner interacts with the GPU for determining different 2D images corresponding to different views of the volume dataset which are displayed on monitor 104. Typically, 2D images are rendered from a volume dataset using volume ray casting for the high quality of the rendered images. The method for volume ray casting according to embodiments of the invention described herein below enables volume rendering of large size volume datasets, for example, diagnostic quality medical image datasets, at computation times which are useful for numerous interactive processes. It will become evident to those skilled in the art that the embodiments of the invention described herein below are implementable by executing executable commands stored in memory 107 and executed on processor 108 of one of various standard GPUs wherein the executable commands are created using one of various standard programming languages and GPUs. Alternatively, the embodiments of the invention are implemented using other processing units such as, for example, a CPU 110 and system memory 112 of various types of computers.

Figure 2:
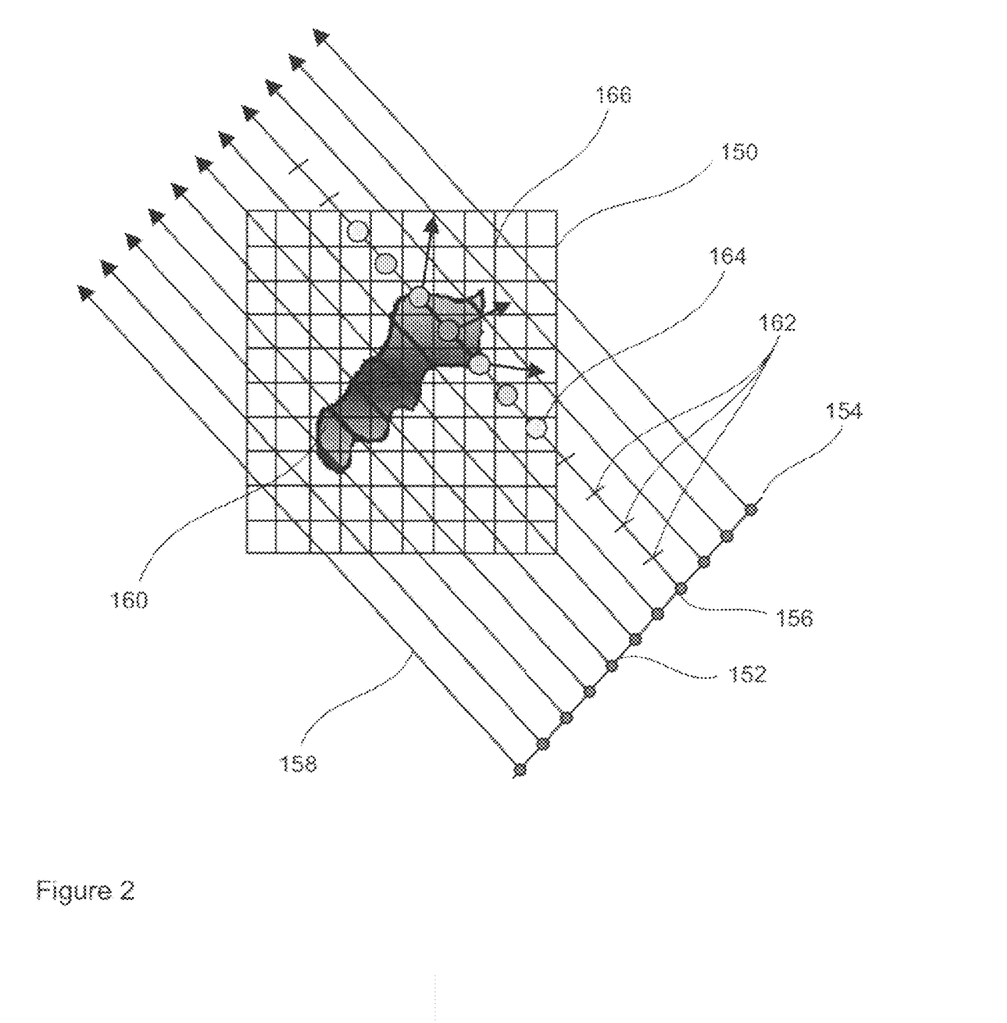
FIGS. 2 and 3 are schematic diagrams illustrating the geometry of volume ray casting according to embodiments of the invention.
Figure 3:
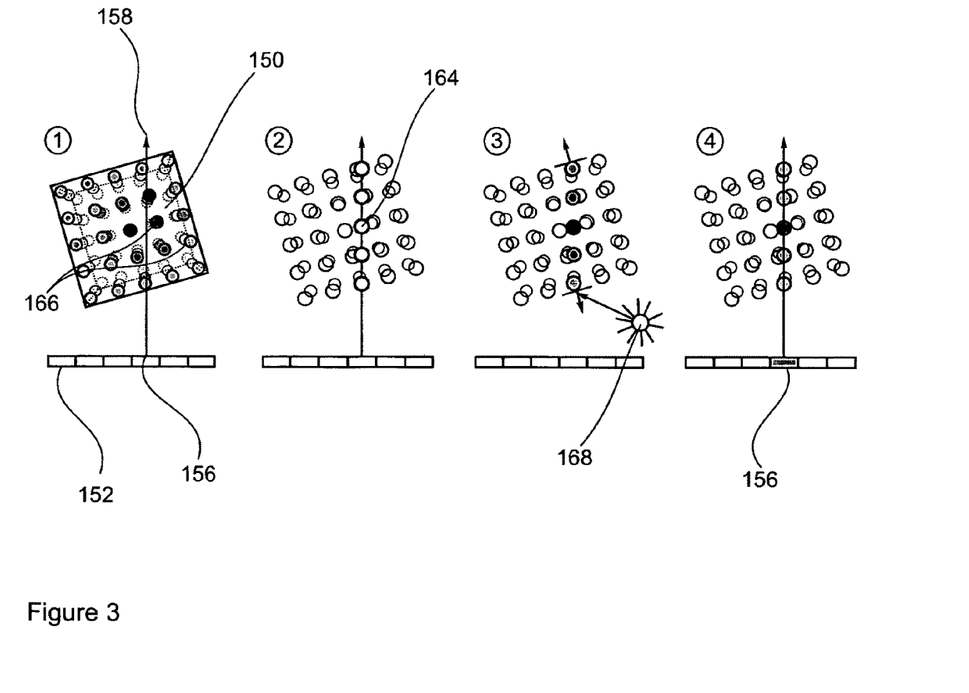
Figure 4:
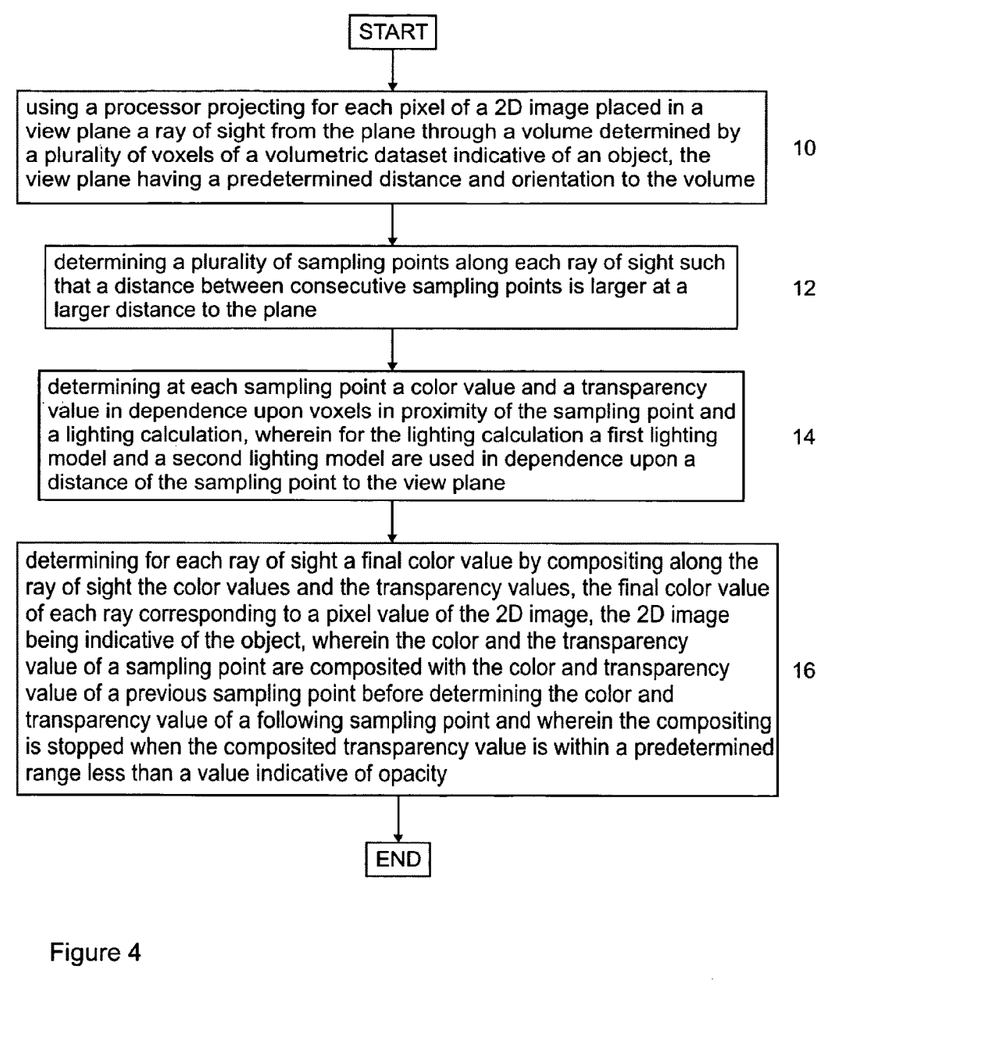
FIG. 4 is a simplified flow diagram of embodiments of a method for volume ray casting according to the invention.

Referring to FIGS. 2, 3, and 4, a method for volume ray casting according to embodiments of the invention is provided. FIG. 2 illustrates a volume 150—in a top view—determined by a plurality of voxels of a volumetric dataset located at grid intersections thereof. The volumetric dataset comprises data indicative of an object 160. A 2D image 152 of the volume—object—is a view determined by distance and orientation of a view plane 154 with respect to the volume 150. Using a processor, for example, GPU processor 108, for each pixel 156 of the 2D image 152 placed in the view plane 154 a ray of sight 158 is projected—10—from the view plane 154 through the volume 150. The view plane 154 has a predetermined distance and orientation to the volume 150, typically determined through user interaction with the processor performing the rendering operation using, for example, a keyboard or a graphical user interface. The rays of sight 158 are projected for providing a parallel projection, i.e. having an orientation perpendicular to the view plane and parallel to each other. Alternatively, the rays of sight 158 are projected for providing a perspective projection, i.e. originating from a single predetermined point and projecting in a diverging fashion through the view plane 154 and the volume 150.

The number of rays of sight is not limited to one ray per image pixel. Optionally, the number of rays is configured such that there is a plurality of rays per pixel—occurring, for example, in perspective projection—or such that there are less than one ray per pixel—resulting in black dots in the 2D image. Further optionally, ray jittering—randomly or pseudo randomly setting the ray to an offset from the pixel center—is used to remove aliasing artifacts from the 2D image.

At 12, using the processor a plurality of sampling points 162 is determined along each ray of sight 158 such that a distance between two consecutive sampling points is larger at a larger distance to the view plane 154. For example, as the ray of sight 158 travels along its path the position of a sampling point is incremented by a value "step". In the depth-of-field concept according to an embodiment of the invention the step is incremented slightly at each iteration along the path of the ray of sight 158. Thus, with increasing distance to the view plane 154 the resolution becomes less accurate as data values are sampled at a lower frequency. The decrease in the sampling rate also decreases the number of samples used to calculate the final color value of the respective 2D image pixel 156 resulting in a substantially improved performance. The area of the volume 150 closest to the "viewer"—i.e. the view plane 154—is sampled at a high sampling rate, while areas of the volume 154 at a further distance to the viewer are sampled at a lower sampling rate. The result is that the front of the volume 150 appears to be "in focus" while the back of the volume 150 appears slightly "out of focus"—depending on the step increase. Alternatively, the step between two consecutive sampling points is a same in an area close to the viewer and then changed to a larger step constant or increasing—at a larger distance to the viewer.

Using the processor a color value and a transparency value is determined at each sampling point—14—in dependence upon voxels 166 in proximity of the sampling point 164 and a lighting calculation. Since in general the sampling points 164 of the ray of sight 158 are not aligned with the voxels 166 disposed in the volume 150, the color value and the transparency value corresponding to a sampling point 164 are determined using interpolation such as, for example, trilinear interpolation. The color values and the transparency—alpha—values are, for example, retrieved from a Color Look-Up-Table (CLUT).

The calculation at each sampling point also includes the lighting calculation—shading—that determines the effect of a light source 168. The light source 168 is projected along a direction that is different than the direction of the ray of sight 158. At each sampling point a gradient representing the orientation of local surfaces of the object 160 within the volume 150 is determined. The samples are then shaded—i.e. colored and lighted—according to their surface orientation and the light source 168. The lighting in dependence upon the gradient is determined using a lighting model such as, for example, Phong shading or Gourad shading. The Phong shading contains calculations for determining ambient, diffuse, and specular lighting conditions. The Phong shading is computationally more intense than Gourad shading but produces substantially higher image quality.

According to an embodiment of the invention a first lighting model and a second lighting model are used for the lighting calculation in dependence upon a distance of the sampling point 162 to the view plane 154. For example, instead of using the Phong shading model for the entire length of the ray of sight 158, Phong shading is applied for a predetermined first portion of the ray closer to the view plane 154, and then the specular lighting calculation is disabled for a predetermined second portion at a larger distance to the view plane 154. This "hybrid" lighting model results in a front-facing result that contains Phong shading but at a further distance into the volume the Gourad shading model is used. Alternatively, other lighting models are employed as a first and a second lighting model.

Using the processor for each ray of sight 158 a final color value is determined—16—by compositing along the ray of sight the color values and the transparency values. The final color value of each ray of sight 158 corresponds to a pixel 156 value of the 2D image 152 which is indicative of the object 160. The color and the transparency value of a sampling point 164 are composited with the color and transparency value of a previous sampling point before determining the color and transparency value of a following sampling point.

According to an embodiment of the invention the compositing and, therefore, the sampling is stopped when the composited transparency value is within a predetermined range less than a value indicative of opacity.

In general, the sampling is performed until the accumulated transparency reaches a value of 1.0—indicative of opacity. In case the accumulated value does not reach 1.0 the sampling is terminated at the back of the volume 150. In many situations this results in sampling through empty space. In the embodiment according to the invention rather than using the value 1.0 indicative of opacity the value for stopping the sampling is configurable within a predetermined range of, for example, 0.9 to 1.0 causing the sampling to terminate earlier with a negligible impact on image quality but a substantial improvement in computational performance. Terminating the sampling at a value less than 1.0 decreases the number of lighting calculations per ray of sight 158.

The calculation of each pixel value of the 2D image 152 according to the embodiments of the invention can be performed in parallel. A GPU based configuration is well suited for the implementation due to the GPU's massively parallel architecture, but the implementation is not limited thereto.

The present invention has been described herein with regard to preferred embodiments. However, it will be obvious to persons skilled in the art that a number of variations and modifications can be made without departing from the scope of the invention as described herein.

What is claimed is:

1. A method comprising:

using a processor projecting for a pixel of a 2D image placed in a view plane a ray of sight from the view plane through a volume determined by a plurality of voxels of a volumetric dataset indicative of an object, the view plane having a predetermined distance and orientation to the volume;

using the processor determining a plurality of sampling points along the ray of sight such that a distance between consecutive sampling points is larger at a larger distance to the view plane, wherein the distance between consecutive sampling points increases incrementally with each set of consecutive sampling points along the path of the ray of sight;

using the processor determining for at least a portion of the plurality of sampling points a color value and a transparency value in dependence upon voxels in proximity of the respective sampling point and in dependence upon a lighting calculation; and, using the processor determining for the ray of sight a final color value by compositing along the ray the color values and the transparency values, the final color value of the ray contributing to a pixel value of the 2D image, the 2D image being indicative of the object.

2. A method as defined in claim 1 wherein one ray of sight is projected for each pixel of the 2D image and wherein the final color value of the ray of sight corresponds to a respective pixel value.

3. A method comprising:
using a processor projecting for a pixel of a 2D image placed in a view plane a ray of sight from the view plane through a volume determined by a plurality of voxels of a volumetric dataset indicative of an object, the view plane having a predetermined distance and orientation to the volume;
using the processor determining a plurality of sampling points along the ray of sight such that a distance between consecutive sampling points is larger at a larger distance to the view plane, wherein the distance between consecutive sampling points increases incrementally with each set of consecutive sampling points along the path of the ray of sight;
using the processor determining for at least a portion of the plurality of sampling points a color value and a transparency value in dependence upon voxels in proximity of the respective sampling point and a lighting calculation; and,
using the processor determining for the ray of sight a final color value by compositing along the ray the color values and the transparency values, the final color value of the ray contributing to a pixel value of the 2D image, the 2D image being indicative of the object, wherein the compositing is stopped when the composited transparency value is within a predetermined range less than a value indicative of opacity.

4. A method as defined in claim 3 wherein one ray of sight is projected for each pixel of the 2D image and wherein the final color value of the ray of sight corresponds to a respective pixel value.

5. A method as defined in claim 3 wherein the color and the transparency value of a sampling point are composited with the color and transparency value of a previous sampling point before determining the color and transparency value of a following sampling point.

6. A non-transitory storage medium having stored therein executable commands for execution on a processor of a computer system, the processor when executing the commands performing:
projecting for a pixel of a 2D image placed in a view plane a ray of sight from the view plane through a volume determined by a plurality of voxels of a volumetric dataset indicative of an object, the view plane having a predetermined distance and orientation to the volume;
determining a plurality of sampling points along the ray of sight such that a distance between consecutive sampling points is larger at a larger distance to the view plane, wherein the distance between consecutive sampling points increases incrementally with each set of consecutive sampling points along the path of the ray of sight;
determining for at least a portion of the plurality of sampling points a color value and a transparency value in dependence upon voxels in proximity of the respective sampling point and in dependence upon a lighting calculation; and,
determining for the ray of sight a final color value by compositing along the ray the color values and the transparency values, the final color value of the ray contributing to a pixel value of the 2D image, the 2D image being indicative of the object.

7. A non-transitory storage medium having stored therein executable commands for execution on a processor of a computer system, the processor when executing the commands performing:
projecting for a pixel of a 2D image placed in a view plane a ray of sight from the view plane through a volume determined by a plurality of voxels of a volumetric dataset indicative of an object, the view plane having a predetermined distance and orientation to the volume;
determining a plurality of sampling points along the ray of sight such that a distance between consecutive sampling points is larger at a larger distance to the view plane, wherein the distance between consecutive sampling points increases incrementally with each set of consecutive sampling ponts along the path of the ray of sight;
determining for at least a portion of the plurality of sampling points a color value and a transparency value in dependence upon voxels in proximity of the respective sampling point and a lighting calculation; and,
determining for the ray of sight a final color value by compositing along the ray the color values and the transparency values, the final color value of the ray contributing to a pixel value of the 2D image, the 2D image being indicative of the object, wherein the compositing is stopped when the composited transparency value is within a predetermined range less than a value indicative of opacity.

* * * * *